United States Patent [19]
Koopman et al.

[11] Patent Number: 6,021,709
[45] Date of Patent: Feb. 8, 2000

[54] APPARATUS, SYSTEM, AND METHODS FOR PREPARING FOOD PRODUCTS USING HIGH VELOCITY AIR FLOW

[75] Inventors: Peter J. Koopman, Richmond, Ind.; Barry Baker, Marysville, Ohio

[73] Assignee: Henny Penny Corporation, Eaton, Ohio

[21] Appl. No.: 09/179,960

[22] Filed: Oct. 28, 1998

Related U.S. Application Data

[60] Provisional application No. 60/063,355, Oct. 28, 1997.

[51] Int. Cl.$^7$ .................................................. A21B 1/00
[52] U.S. Cl. ........................... 99/476; 99/468; 126/21 A; 219/400
[58] Field of Search ............................. 99/476, 474, 473, 99/467, 468; 126/21 A, 20; 219/400, 401

[56] References Cited

U.S. PATENT DOCUMENTS

| | | |
|---|---|---|
| 2,283,182 | 5/1942 | Carl . |
| 2,831,098 | 4/1958 | Luscher . |
| 2,860,225 | 11/1958 | Steen . |
| 2,919,339 | 12/1959 | Hilliker . |
| 3,222,114 | 12/1965 | Stentz . |
| 3,311,434 | 3/1967 | Dyer et al. . |
| 3,601,582 | 8/1971 | DeBoisfleury . |
| 3,886,346 | 5/1975 | Meyers ..................................... 219/386 |
| 3,908,749 | 9/1975 | Williams . |
| 3,943,842 | 3/1976 | Bills et al. ............................. 99/476 X |
| 4,019,022 | 4/1977 | Seider et al. ............................. 219/386 |
| 4,030,476 | 6/1977 | Hock ........................................ 126/246 |
| 4,093,041 | 6/1978 | Davis et al. . |
| 4,126,775 | 11/1978 | Wyatt ....................................... 219/400 |
| 4,132,216 | 1/1979 | Guibert .................................... 126/261 |
| 4,180,125 | 12/1979 | Schulz et al. ........................... 165/48.1 |
| 4,194,109 | 3/1980 | Springer .................................. 219/386 |
| 4,210,675 | 7/1980 | Liebermann ............................ 426/233 |
| 4,224,862 | 9/1980 | Liebermann .............................. 99/331 |
| 4,225,204 | 9/1980 | Bellavoine .............................. 312/236 |
| 4,233,495 | 11/1980 | Scoville et al. ......................... 219/386 |
| 4,235,282 | 11/1980 | de Filippis et al. ...................... 165/61 |
| 4,278,697 | 7/1981 | Liebermann ............................ 426/506 |
| 4,285,391 | 8/1981 | Bourner ..................................... 165/30 |
| 4,323,110 | 4/1982 | Rubbright et al. .......................... 165/2 |
| 4,345,143 | 8/1982 | Craig et al. ............................. 219/411 |
| 4,346,756 | 8/1982 | Dodd et al. ............................ 165/48.1 |
| 4,495,932 | 1/1985 | Bratton ..................................... 126/20 |
| 4,757,184 | 7/1988 | Swanson et al. ....................... 219/400 |
| 5,069,273 | 12/1991 | O'Hearne ................................. 165/12 |
| 5,086,693 | 2/1992 | Tippmann et al. ....................... 99/333 |
| 5,159,973 | 11/1992 | Pennington ............................ 165/48.1 |
| 5,182,438 | 1/1993 | Oakes et al. ........................... 219/386 |

(List continued on next page.)

OTHER PUBLICATIONS

Lau Industries, Model SIDD Blower Specification Sheet and Model SIDD 10–4A Performance Curves (Oct. 9, 1995).

*Primary Examiner*—Reginald L. Alexander
*Attorney, Agent, or Firm*—Baker & Botts, L.L.P.

[57] ABSTRACT

An apparatus prepares food products using high velocity air flow. The apparatus includes a cabinet for holding food products and a blower for supplying an air flow to the cabinet in order to heat the food products to a preparation temperature and to maintain the food products at a holding temperature. The cabinet includes a plurality of air inlet ports through which a portion of the air flow enters the cabinet, and a plurality of air outlet ports from which the air flow exits the cabinet. The air flow is controlled at a rate within a range of about 1800 to about 2000 cubic feet per minute during a preparation period and within a range of about 810 to about 930 cubic feet per minute during a holding period. Further, a method for preparing food products using high velocity air flow includes the following steps: placing food products contained in a substantially moisture-tight, storage bags into a cabinet; directing an air flow against the storage bags at a first flow rate within a range of about 1800 to about 2000 cubic feet per minute during a preparation period, and then directing an air flow against the storage bags at a second flow rate within a range of about 810 to about 930 cubic feet per minute during a holding period.

25 Claims, 5 Drawing Sheets

U.S. PATENT DOCUMENTS

| | | | |
|---|---|---|---|
| 5,201,364 | 4/1993 | Tippmann et al. | 165/26 |
| 5,203,258 | 4/1993 | Tippmann et al. | 99/483 |
| 5,223,290 | 6/1993 | Alden | 426/243 |
| 5,285,051 | 2/1994 | DeGrow et al. | 219/386 |
| 5,361,686 | 11/1994 | Koopman | 99/476 X |
| 5,375,511 | 12/1994 | Huie et al. | 99/483 |
| 5,394,791 | 3/1995 | Vallee | 99/476 X |
| 5,396,046 | 3/1995 | Oelfke | 219/386 |
| 5,404,935 | 4/1995 | Liebermann | 165/48.1 |
| 5,615,603 | 4/1997 | Polin | 99/476 X |
| 5,676,044 | 10/1997 | Lara, Jr. et al. | 99/476 X |
| 5,724,886 | 3/1998 | Ewald et al. | 99/374 |
| 5,783,803 | 7/1998 | Robards, Jr. | 219/392 |

APPARATUS, SYSTEM, AND METHODS FOR PREPARING FOOD PRODUCTS USING HIGH VELOCITY AIR FLOW

This application claims priority under 35 U.S.C. § 119(e) from Provisional Application Ser. No. 60/063,355, filed Oct. 28, 1997.

BACKGROUND OF THE INVENTION

1. Field of the Invention

The invention relates to apparatus, systems, and methods for preparing food products using high velocity air flow, and more particularly, to apparatus, systems, and methods for preparing baked goods, such as buns, rolls, and other bread-products, using high velocity, low temperature air flow.

2. Description of Related Art

In order to enhance the organoleptic perceptions of a food product, including baked goods, such as a hamburger buns, hot dog or sandwich rolls, or the like, commercial or institutional food providers may heat or toast such baked goods. Current methods for preparing such baked goods, however, are time consuming and labor intensive. For example, buns for use in preparing hamburgers and other sandwiches, are stored in freezers in protective plastic storage bags. Frequently, these bags are not hermetically sealed, but instead, are twisted shut and are sealed with a wire twist, a plastic gathering clip, or the like. The buns are removed from the freezer about twenty-four hours in advance of use, so that they may thaw and stabilize. The buns are allowed to thaw in their storage bags, so that moisture crystallized during freezing is released from and re-absorbed throughout the buns.

After the buns have thawed and stabilized, they are unpacked from the storage bags, separated, and placed into a toaster, an oven, or other heating apparatus. Thus, prior to heating, the buns are individually handled and exposed to the surrounding environment outside of their storage bags. Once heated, the buns are removed from the heating apparatus, re-assembled, and repackaged in their storage bags. Thus, after heating, the buns again are individually handled and exposed to the surrounding environment, outside of their storage bags. The re-packaged buns then are placed in a temperature-controlled, holding cabinet, until needed.

As evidenced by the foregoing description, this method is labor intensive requiring significant handling of the buns during their unpacking and separation prior to heating and their re-assembly and repacking after heating. Further, the buns are handled during their transfer from the heating apparatus to the holding cabinet. In addition to involving exposure of the buns to the environment outside of their storage bags and requiring significant handling, current methods of bun preparation employ at least two separate apparatus, i.e., a heating or preparation apparatus and a temperature-controlled, holding cabinet.

Although the foregoing describes methods, systems, and apparatus with respect to the preparation of buns, similar methods and apparatus are employed in the preparation for serving of other food products.

SUMMARY OF THE INVENTION

It is an object of the present invention to provide a quick and energy efficient method for preparing food products, e.g., re-thermalizing pre-cooked or frozen food products, and in particular, heating baked goods, such as breads, rolls, and buns. It is a feature of this invention that the food products may be heated solely through the use of high velocity air flow. Such high velocity air flow may be obtained by supplying a large volume of air to an enclosed space. Further, it is an advantage of the invention that the temperature in the apparatus and the temperature of the food products may be controlled by varying the velocity of the air flow or by adding an air temperature control device, such as an air heating or air cooling device, to the apparatus, or by a combination of these means.

It is a further object of the present invention to efficiently provide a controlled environment for maintaining the temperature and texture of such baked goods for later use in the preparation of food products, such as hamburgers, hot dogs, and other sandwiches. It is a feature of this invention that the baked goods are maintained at a temperature sufficiently low to prevent toughening due to structural changes in the elements of the baked goods or drying out of the baked goods prior to use or serving. It is an advantage of the apparatus that the baked goods may be heated within sealed, storage packaging, such as plastic storage bags, whereby the loss of moisture from the containers may be limited and the loss of heat and moisture from baked goods during the holding period may be reduced.

It is still another object of the present invention that it is more cost efficient than apparatus, systems, and methods of the related art. It is a feature of the present invention that it is less labor intensive than the related art. It is an advantage of the present invention that the food products need not be removed from their storage packaging before heating and that the food products need not be returned to their storage packaging after heating. It is a further advantage of this invention that cooling and drying of the food products caused by exposure to the environment during removal from packaging and repackaging is reduced. It is still another advantage of the invention that loss due to improper handling of the food products during removal from packaging and repackaging, e.g., crushing, tearing, or floor loss of baked goods, is reduced. It is yet another advantage of this invention that fewer employees and less time is required to prepare the food products.

It is yet another object that food products prepared in accordance with this invention are more appealing to consumers. It is a feature of this invention that the food products are exposed to the environment outside of their storage packaging for a reduced period of time and that individual food products are less frequently handled before being served to consumers. It is an advantage of the invention that it reduces or eliminates exposure to high temperatures and to the drying and cooling effects of environmental changes, which may degrade the food products and adversely effect the consumer's organoleptic perception of the food products. For example, undesirable exposure of the food products to high temperatures and environmental changes may result in the food products, such as baked goods, having hard and/or dry areas and/or edges. It is a further advantage of the invention that because the food products are handled less frequently, the risk of contamination of the food products with bacteria, viruses, spores, or the like, is reduced.

In an embodiment of the invention, an apparatus for preparing food products using high velocity air flow may comprise a cabinet for holding food products and a blower for supplying an air flow to the cabinet to heat the food products to a preparation temperature and to maintain the food products at a holding temperature. The cabinet may include a plurality of air inlet ports through which the air flow enters the cabinet, and a plurality of air outlet ports from which the air flow exits the cabinet. The air inlet ports may be arranged to permit the air flow to enter the cabinet above and below the food products. Further, the air flow is controlled at a rate within a first predetermined range during a preparation period and within a second predetermined range during a holding period.

In another embodiment of the invention, an apparatus for preparing food products using high velocity air flow, may comprise a cabinet for holding food products; a variable speed blower for supplying an air flow to the cabinet; a heater for heating the air flow entering the cabinet, whereby the food products are heated to a preparation temperature and the food products are maintained at a holding temperature; and an air temperature control device for adjusting a temperature of the air within the cabinet including a first temperature sensor for measuring the air temperature within the cabinet. The cabinet may include a plurality of air inlet ports through which the air flow enters the cabinet, and a plurality of air outlet ports from which the air flow exits the cabinet. As noted above, the air inlet ports may be arranged to permit the air flow to enter the cabinet above and below the food products. The air flow may be controlled at a rate within a first range of about 1800 to about 2000 cubic feet per minute (CFM) during a preparation period and within a second range of about 810 to about 930 CFM during a holding period.

In yet another embodiment of the invention, a system for preparing food products using high velocity air flow may comprise at least one moisture retaining storage package for encasing food products, a cabinet for holding the packages of food products, and a blower for supplying an air flow to the cabinet to heat the food products to a preparation temperature and to maintain the food products at a holding temperature. The cabinet includes a plurality of air inlet ports through which the air flow enters the cabinet and is directed against the packages, and a plurality of air outlet ports from which the air flow exits the cabinet. The air inlet ports may be arranged to permit the air flow to enter the cabinet above and below the packages of food products or trays on which are placed the packages of food products. Consequently, some heat may be transferred to the products from below, e.g., through the trays. Further, the air flow is controlled at a rate within a first predetermined range during a preparation period and within a second predetermined range during a holding period.

In still another embodiment, the invention is a method for preparing food products using high velocity air flow. The method may comprise the steps of placing food products contained in moisture retaining storage packaging, e.g., a substantially moisture-tight, storage bag, into a cabinet; directing an air flow against the storage packaging at a first flow rate within a first predetermined range during a preparation period; and directing an air flow against the storage packaging at a second flow rate within a second predetermined range during a holding period. The air flow may be directed against the packages of food products or trays on which are placed the packages of food products, from both above and below. Consequently, some heat may be transferred to the food products from below, e.g., through the trays.

In a further embodiment, a method for preparing food products using high velocity air flow may comprise the steps of thawing food products in moisture retaining storage packaging, e.g., a substantially moisture-tight, storage bag; placing the substantially moisture-tight, storage packaging containing the thawed food products into a cabinet; directing an air flow against the storage packaging at a first flow rate within a first predetermined range during a preparation period; directing an air flow against the storage packaging at a second flow rate within a second predetermined range during a holding period; and monitoring the air temperature within the cabinet during the preparation and holding periods. The air flow may be directed against the packages of food products or trays on which are placed the packages of food products, from both above and below. Consequently, some heat may be transferred to the food products from below, e.g., through the trays. Further, the method may include the step of adjusting the air flow rate or heating the air flow prior to its entry into the cabinet, or both, to maintain a predetermined air temperature.

Other objects, features, and advantages will be understood by persons skilled in the art in view of the following detailed description of preferred embodiments with respect to the accompanying drawings.

DETAILED DESCRIPTION OF PREFERRED EMBODIMENTS

Figure 1:
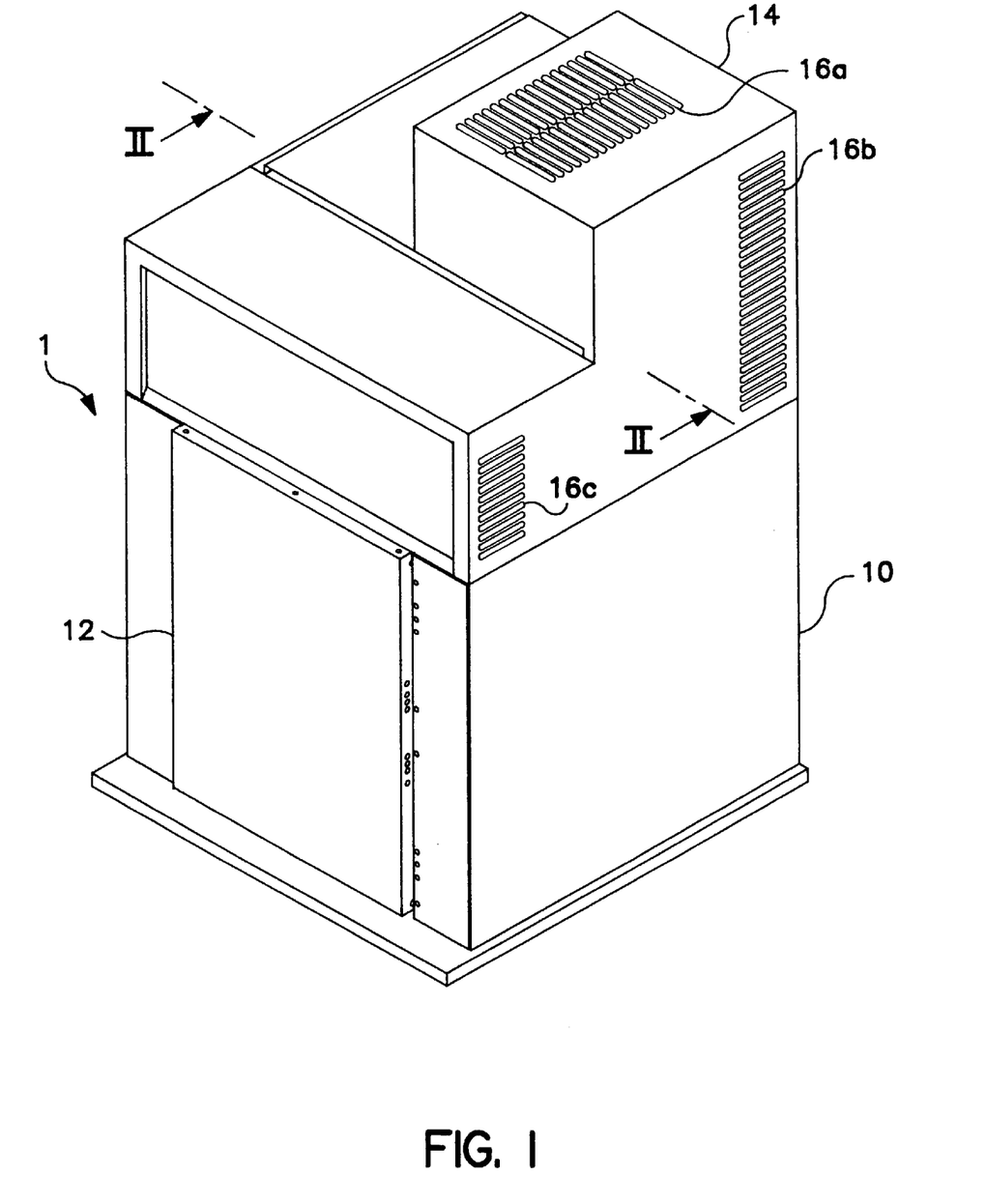
FIG. 1 is a perspective view of the exterior of an embodiment of an apparatus of the present invention.

Referring to FIG. 1, a perspective view of the exterior of an embodiment of an apparatus 1 of the present invention is depicted. Apparatus 1 includes a cabinet housing 10 having a cabinet access 12. Cabinet access 12 permits trays holding packages of thawed food products to be placed inside the cabinet. A blower housing 14 is mounted on top of cabinet housing 10. Blower cooling air vents 16a–c permit air to flow around and to cool a blower (not shown) during operation. Cabinet housing 10, cabinet access 12, and blower housing 14 may be manufactured from stainless steel to ensure durability and simplified cleaning.

Figure 2:
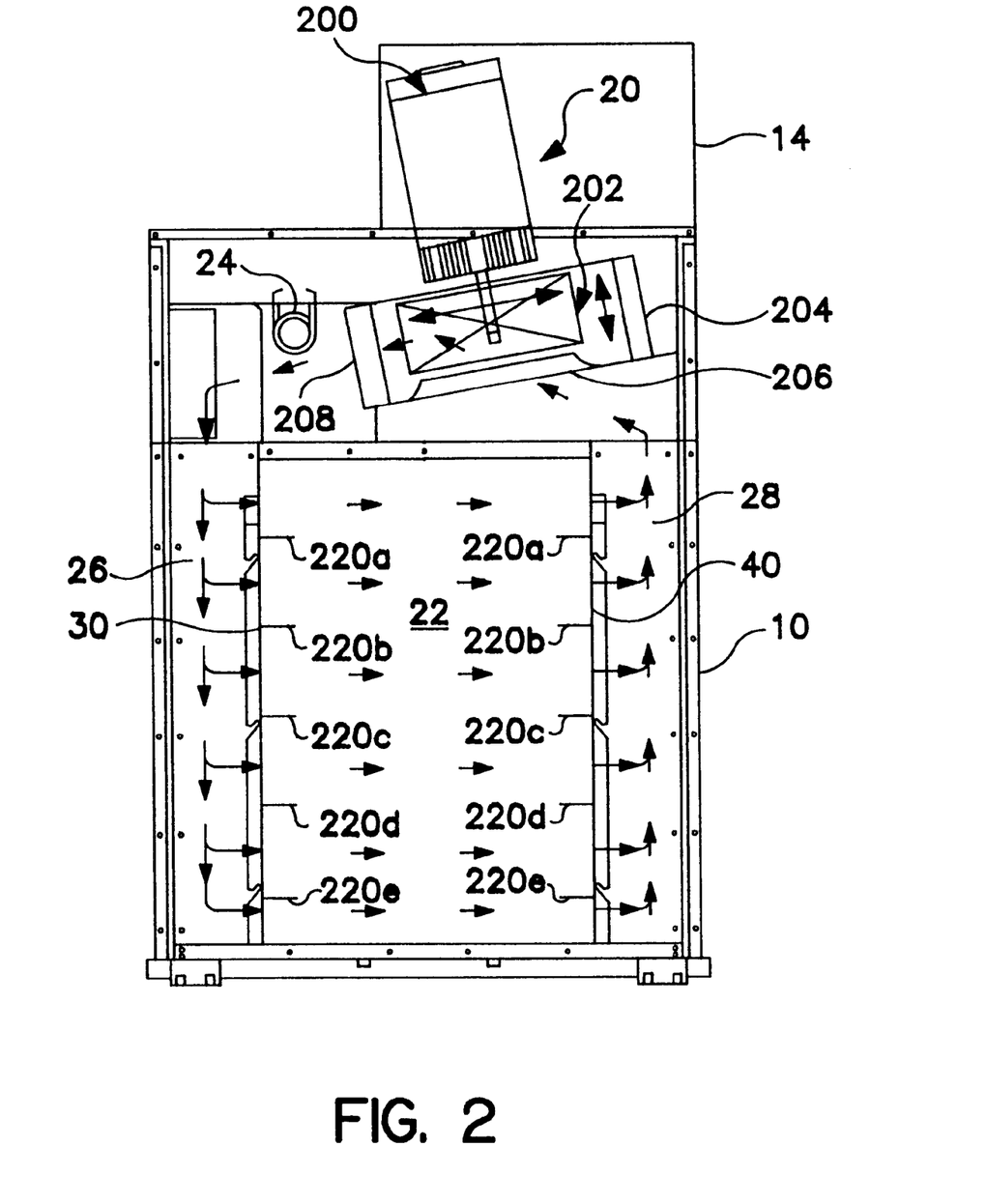
FIG. 2 is a cross-sectional view of the apparatus of FIG. 1 along lines II—II, which depicts the air flow path through the interior of the apparatus.

In FIG. 2, a cross-sectional view of apparatus 1 is depicted along lines II—II of FIG. 1. This view also indicates the air flow path through the cabinet and associated ducts of apparatus 1. A blower 20 is mounted in blower housing 20 above and adjacent to a cabinet 22. Blower 20 includes a blower motor 200 for driving a blower wheel 202. The volume of air flow generated by blower 20 depends of the power generated by blower motor 200 and the size of blower wheel 202. For example, blower 20 may have a variable speed, invertor duty blower motor. Further, such a blower motor may produce about 1.5 horsepower (hp) and may achieve variable speeds in a range of about 775 to about 1775 revolutions per minute (RPM). Suitable blowers include the Model SIDD 10-4A blower available from Lau Industries of Dayton, Ohio, which is driven by a 1.5 hp, variable speed, invertor duty motor, has a blower wheel diameter (d) of about 11 inches and a width (w) of about 4.5 inches, and achieves variable speeds in a range of about 800 to about 1750 RPM.

An air flow is circulated through blower wheel 202 by means of a recirculation duct 204. Recirculation duct 204 has a recirculation duct inlet 206, which receives an air flow from cabinet 22, and a recirculation duct outlet 208, which returns an air flow to cabinet 22. After exiting recirculation duct outlet 208, the air flow passes across an air heater 24. Air heater 24 may be used to raise the temperature of the air flow prior to the air flow's entry into cabinet 22. However, due to the friction created between the air flow and the walls of the cabinet ducts and between the air flow and the food products' packaging, the high velocity air flow alone may be sufficient to raise the temperature of the food products to a desired level.

Figure 5:
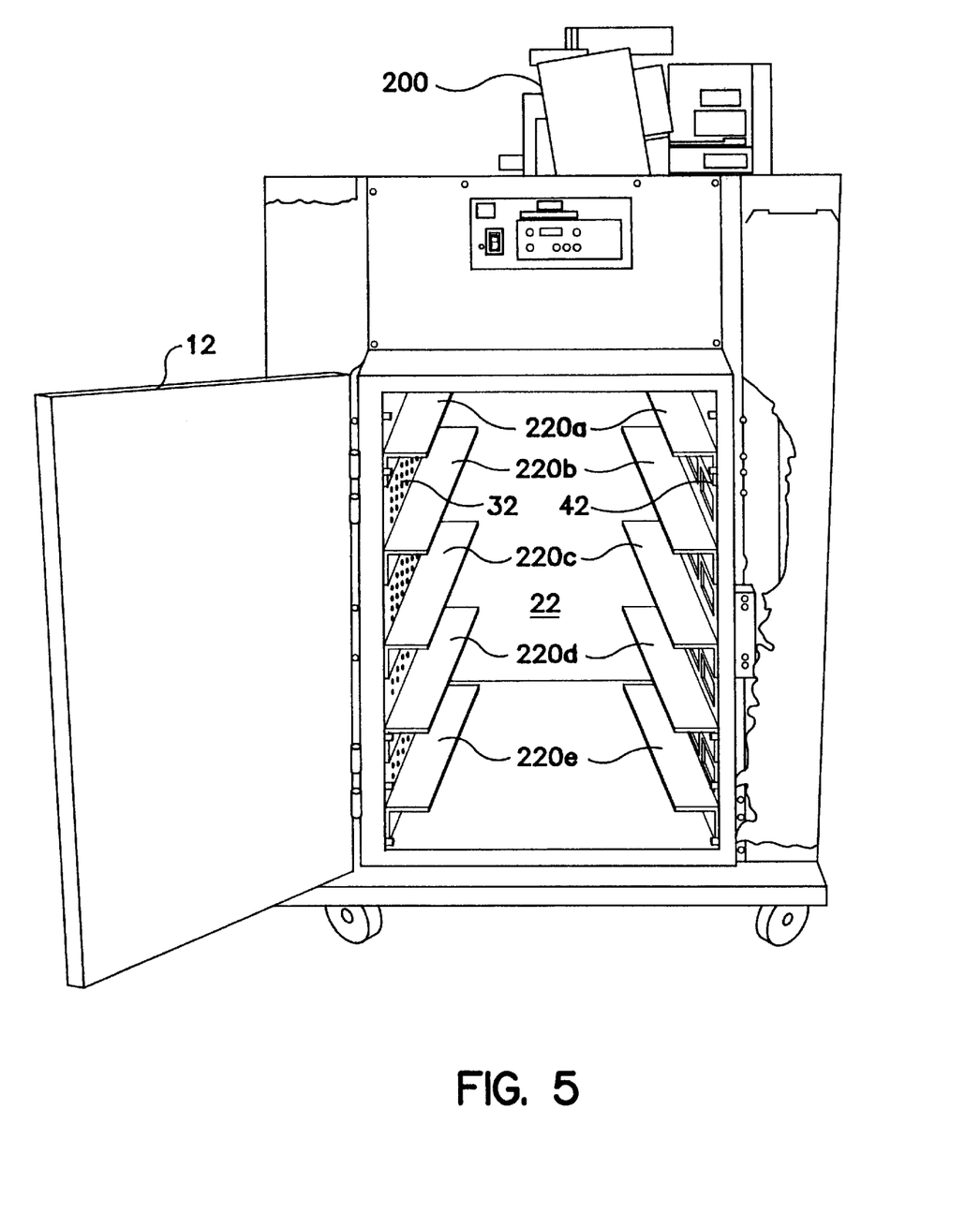
FIG. 5 depicts an apparatus according to the present invention.

Preferably, cabinet 22 is substantially air-tight, so that an air flow rate may be maintained, but the interior of cabinet 22 may be accessed through cabinet access 12, as depicted in FIG. 1. Further, cabinet 22 may comprise at least two opposing cabinet walls, i.e., a cabinet air inlet wall 30 and a cabinet air outlet wall 40. A cabinet air inlet duct 26 is adjacent to cabinet air inlet wall 30 and directs the air flow from blower 20 and heater 24 to cabinet air inlet ports (not shown) in cabinet air inlet wall 30. Similarly, a cabinet air outlet duct 28 is adjacent to cabinet air outlet wall 40 and directs the air flow from cabinet air outlet ports (not shown) in cabinet air outlet wall 40 of cabinet 22 to blower 20 and heater 24 via recirculation duct inlet 206 of recirculation duct 204. Recirculation duct 204 and the walls and ducts of cabinet 22 may be manufactured from stainless steel. Cabinet 22 also includes an air temperature sensor (not shown) for measuring the temperature of the air flow in cabinet 22 or a food products temperature sensor (not shown) for measuring the temperature of the food products in cabinet 22, or both. FIG. 5 depicts an apparatus, such as that described with respect to FIG. 2.

Arrows in FIG. 2 are used to depict the substantially counter-clockwise flow of air through cabinet 22. Cabinet air inlet duct 26 and cabinet air outlet duct 28 are sized, such that static pressure measured at recirculation outlet duct 208 is maintained at a minimum consistent with predetermined rate of air flow, e.g., an air flow rate in a range of about 1800 to about 2000 CFM. For example, a suitable blower, such as the Model SIDD 10-4A blower available from Lau Industries of Dayton, Ohio, operating at a speed in the range of about 1725 to about 1775 RPM, and preferably, at a speed of about 1750 RPM, produces an air flow in the range of about 1800 to about 2000 CFM and creates a static pressure of less than about 2 inches of water gauge measured at the recirculation outlet duct. Essentially, as the air flow output decreases, the static pressure increases. Thus, blower 20 is selected, such that when operating within the desired operating parameters, e.g., operating at a speed in the range of about 1725 to about 1775 RPM, and preferably, at a speed of about 1750 RPM, to produce an air flow rate in the range of about 1800 to about 2000 CFM, the operational limits of blower 20 ensure that cause small changes in static pressure do not substantially effect blower output. More specifically, small changes in static pressure do not cause the air flow rate to fall outside the predetermined range.

Friction between the air flow and the walls of cabinet air inlet duct 26 and cabinet air outlet duct 28 may cause a significant increase in the internal air temperature of cabinet 22. If uncontrolled, this increase may result in the overheating of the food products. As noted above, exposure to high temperatures may degrade the food products and adversely effect the consumer's organoleptic perception of the food products, e.g., undesirable exposure to high temperatures may result in baked goods having hard and/or dry areas and/or edges.

Figure 3:
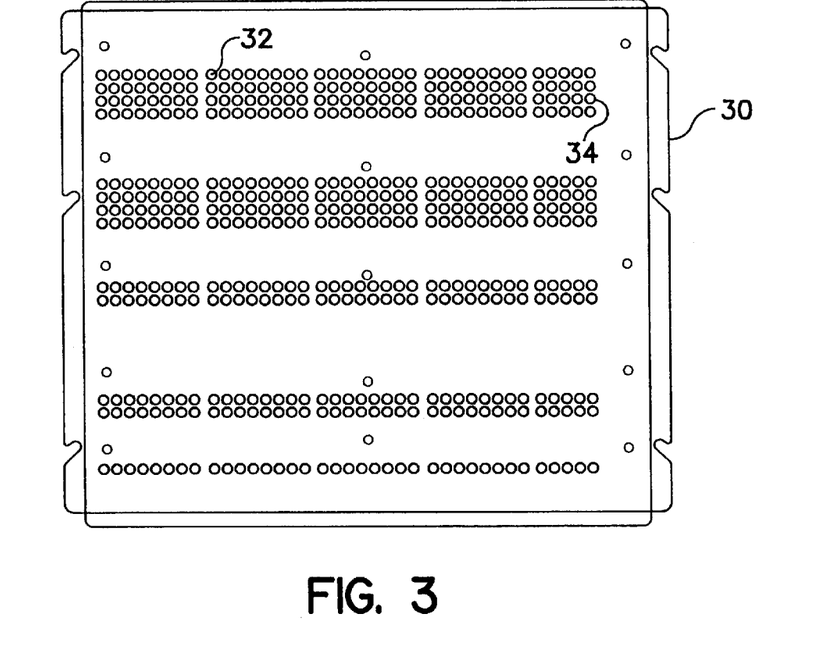
FIG. 3 depicts a configuration of cabinet air inlet ports in the apparatus of FIGS. 1 and 2.
Figure 6:
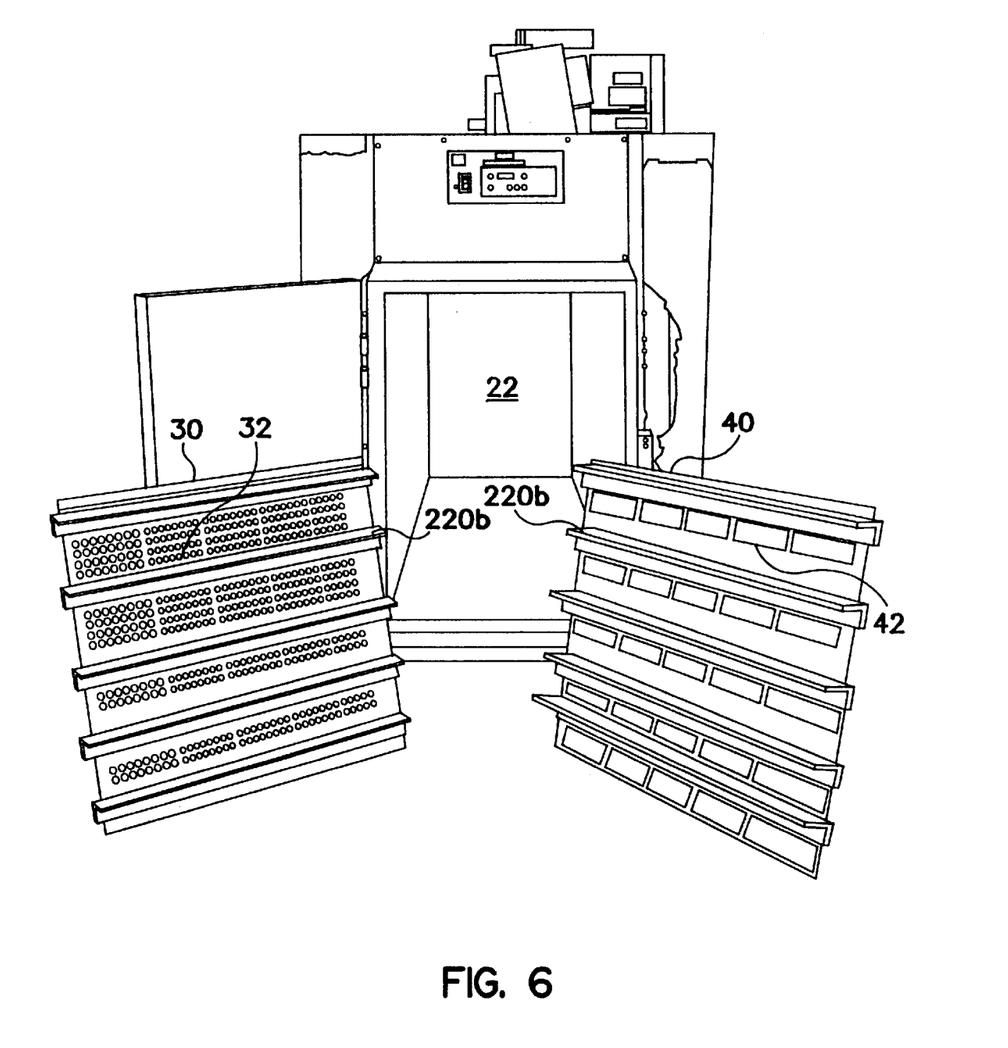
FIG. 6 depicts the apparatus of FIG. 5 with the cabinet air inlet and cabinet air outlet walls removed.

Referring to FIG. 3, cabinet air inlet ports 32 are depicted in cabinet air inlet wall 30. FIG. 6 depicts the apparatus of FIG. 5 with the cabinet air inlet wall removed. In FIG. 2, cabinet 22 is shown to include pairs of parallel rails 220a–e. These rails are positioned, such that each pair of parallel rails 220a–e may receive at least one food products tray (not shown). In particular, these rails may be of sufficient length, so that each may be adapted to receive two food products trays, and each tray may be of sufficient size to carry two packages, e.g., two dozen baked goods. Consequently, in an embodiment of apparatus 1 having five pairs of parallel rails 220a–e as depicted in FIG. 2, cabinet 22 may be used to prepare twenty dozen baked goods per preparation and holding cycle.

Referring again to FIGS. 3 and 6, cabinet air inlet ports 32 are arrayed in inlet port rows 34, and inlet ports may be substantially circular in shape. At least one inlet port row 34 is aligned with each pair of parallel rails 220a–e, so that the air flow entering cabinet 22 through cabinet air inlet ports 32 is directed against the food products packages on the food products trays (not shown). In addition, as shown in FIGS. 2 and 5, a portion of the air flow may enter cabinet 22 over the top of cabinet air inlet wall 30 and impinge against food product packages mounted on the first pair of parallel rails 220a. The number of inlet port rows 34 aligned with each pair of parallel rails 220a–e generally decreases between the uppermost pair of parallel rails 220a and the bottom-most pair of parallel rails 220e. In particular, referring to FIGS. 2 and 3, there are four inlet port rows 34 aligned with pair of parallel rails 220a, but only one inlet port row 34 aligned with pair of parallel rails 220e. Thus, the air flow trough air inlet ports 32 may be directed against the packages of food products, from both above and below. Consequently, some heat may be transferred to the food products from below, e.g., through such trays.

The decrease in the number of rows 34 at the lower portion of cabinet 22 is due to the nature of the air flow within cabinet air inlet duct 26. The air flow from recirculation outlet duct 208 is driven toward the lowest portion of cabinet air inlet duct 26. Thus, an overpressure zone tends to form at the lowest portion of cabinet air inlet duct 26, and the number of rows 34 the lowest portion of cabinet air inlet duct 26 is reduced to prevent a majority of the air flow entering cabinet air inlet duct 26 from entering cabinet 22 adjacent to pair of parallel rails 220e. By varying the number of rows 34 and the separation between groups of rows 34, the air flow entering cabinet air inlet duct 26 is distributed evenly at each pair of parallel rails 220a–e. In addition, cabinet air inlet ports 32 are distributed across substantially the entire width of cabinet air inlet wall 30, so that the entering air flow is distributed evenly against the food products packages on the food products trays (not shown) or against the trays (not shown). Consequently, all of the food products may reach the preparation temperature within the preparation period.

Figure 4:
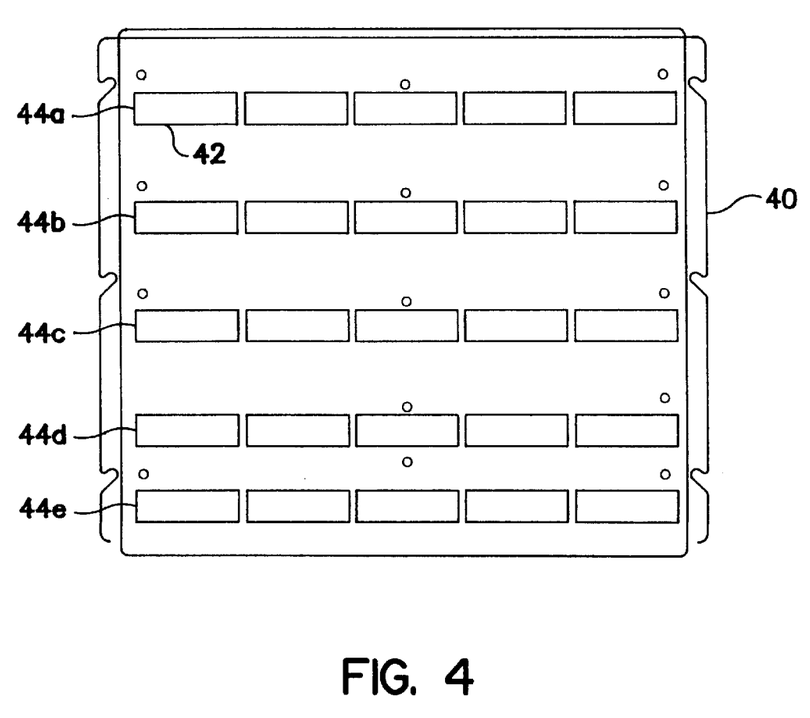
FIG. 4 depicts a configuration of cabinet air outlet ports in the apparatus of FIGS. 1 and 2.

With respect to FIG. 4, cabinet air outlet ports 42 are depicted in cabinet air outlet wall 40. FIG. 6 depicts the apparatus of FIG. 5 with the cabinet air outlet wall removed. Similar to the arrangement of cabinet air inlet ports 32, cabinet air outlet ports 42 are arrayed in outlet port rows 44a–e and may be substantially rectangular in shape. One outlet port row 44a–e is aligned with each pair of parallel rails 220a–e, so that the air flow entering cabinet 22 through cabinet air inlet ports 32 and directed against the food products packages on the food products trays (not shown) exits cabinet 22 through cabinet air outlet ports 42. In addition, cabinet air inlet ports 42 are distributed across substantially the entire width of air flow outlet wall 30, so that the air flow exits evenly after impinging against the food products packages on the food products trays (not shown). Moreover, each of air inlet ports 32 has a size and a shape, such that a size differential between air inlet ports 32 and air outlet ports 42 maintains the air flow rate through cabinet 22 in the range of about 1800 to about 2000 CFM.

The storage packaging may be made from plastic selected from the group consisting of polyvinyl chloride, polyethylene, polystyrene, Mylar, and the like. The storage packaging may be capable of breathing to allow air or air and some moisture to pass through. Further, the storage packaging may be designed so as to permit the air to exit, but not to enter. Similarly, the packaging may prevent or impede the escape of moisture, but may allow moisture to enter.

While not wishing to be bound by theory, it is believed that the advantageous results of the invention are obtained because the storage packaging, i.e., the plastic storage bags, containing the food products are not air tight, some air trapped within the packaging is driven out of the packaging when the high velocity air is directed against the packaging. This may improve the efficiency of the transfer of heat between the high velocity air and the food products by reducing the amount of insulating air surrounding the food products. Nevertheless, because the packages are sealed, moisture otherwise released by the food products during preparation may be retained within the packaging and reabsorbed by the food products. Alternatively, the evaporation of moisture from the food products may be reduced because the high velocity air flow does not come in direct contact with the food products. Further, however, this packaging helps to retain heat in the food products during the holding period.

Under the method of the invention, baked goods, such as hamburger buns, are removed from a freezer and allowed to thaw and stabilize in their storage packaging, e.g., for a period of about twenty-four hours. The storage packages containing the thawed and stabilized baked goods are placed on trays, and each of these trays is slid onto a pair of parallel rails in a preparation and holding cabinet. A blower, such a blower including a 1.5 hp variable speed, invertor duty motor described above, may be operated at a speed in a range of about 1725 to about 1775 RPM, and preferably, at about 1750 RPM, to generate a high volume, high velocity air flow, e.g., in a range of about 1800 to about 2000 CFM. A heater may be used to further raise the temperature of the air within the cabinet, as necessary, such that the temperature remains at a preparation temperature, which is dependent on the composition of the baked goods, e.g., less than about 150° F., and preferably at about 140° F., for hamburger buns. In this manner, about twenty dozen hamburger buns may be raised to a temperature of about 140° F. within about 30 minutes. The blower speed may be reduced to a speed in a range of about 775 to about 825 RPM, and preferably, at about 800 RPM. Consequently, the rate of air flow then may be reduced, e.g., to range of about 810 to about 930 CFM, and preferably, at about 870 CFM, to maintain the baked goods at a predetermined holding temperature, which is less than the preparation temperature, such as about 130° F. for hamburger buns, for a holding period, e.g., about 210 minutes.

Although the invention has been described in detail with respect to the foregoing preferred embodiments, the scope to the invention is not limited to these preferred embodiments, but is determined by the scope of the claims which follow. It will be understood by those skilled in the art that modifications and variations may be made to the preferred embodiments described above without departing from the scope of the invention as defined by the following claims.

What is claimed is:

1. An apparatus for preparing food products using high velocity air flow, comprising a cabinet for holding food products, and a blower for supplying an air flow to said cabinet to heat said food products to a preparation temperature and to maintain said food products at a holding temperature:

wherein said cabinet includes a plurality of air inlet ports through which at least a portion of said air flow enters said cabinet, and a plurality of air outlet ports from which said air flow exits said cabinet, wherein said air inlet ports have a first size and shape and said air outlet ports have a second size and shape, such that a size differential is created between said air inlet ports and said air outlet ports for maintaining an air flow rate within said cabinet; and wherein said air flow is controlled at a rate within a first predetermined range during a preparation period and within a second predetermined range during a holding period.

2. The apparatus of claim 1, wherein said first predetermined range is about 1800 to about 2000 cubic feet per minute.

3. The apparatus of claim 1, wherein said second predetermined range is about 810 to about 930 cubic feet per minute.

4. The apparatus of claim 1, wherein said preparation temperature is about 140° F. and the preparation period is about 30 minutes and said holding temperature is about 130° F. and the holding period is about 210 minutes.

5. The apparatus of claim 1, wherein said air inlet ports are arranged in a plurality of rows and said plurality of horizontal rows are divided into a plurality of horizontal row sets arranged between an upper portion of a cabinet side wall and a lower portion of said cabinet side wall, such that the number of rows in said uppermost row set is greater the number of rows in said lowest row set.

6. The apparatus of claim 1, wherein said plurality of inlet ports are formed in a first cabinet wall and said plurality of outlet ports are formed in a second cabinet wall and wherein said second cabinet wall is opposite said first cabinet wall.

7. The apparatus of claim 1, wherein said plurality of inlet ports are formed in a pattern to distribute said air flow evenly against said food products.

8. The apparatus of claim 1, further comprising a first temperature sensor for measuring an air temperature within said cabinet.

9. The apparatus of claim 1, wherein said air inlet ports are arranged in a plurality of rows and said plurality of horizontal rows are divided into a plurality of horizontal row sets arranged between an upper portion of a cabinet side wall and a lower portion of said cabinet side wall, and wherein said uppermost row set includes a predetermined number of rows and the number of rows in any of said row sets below said uppermost row set is less than the number of rows in said uppermost row set.

10. The apparatus of claim 1, further comprising a second temperature sensor for measuring a temperature of said food products.

11. The apparatus of claim 1, further comprising a air temperature control device for adjusting a temperature of said air within said cabinet.

12. The apparatus of claim 11, wherein said air temperature control device further includes a first temperature sensor for measuring said air temperature within said cabinet.

13. The apparatus of claim 11 wherein said air temperature control device further includes a second temperature sensor for measuring a temperature of said food products.

14. The apparatus of claim 11, wherein said air temperature control device further includes an air heater.

15. The apparatus of claim 14, further comprising a first temperature sensor for measuring said air temperature within said cabinet, wherein a temperature control device monitors said measured air temperature from said first temperature sensor, determines a temperature difference between said measured air temperature to a preselected air temperature, and controls said heater to reduce said temperature difference.

16. The apparatus of claim 11, wherein said air temperature control device further includes an air cooling device.

17. The apparatus of claim 16, further comprising a first temperature sensor for measuring said air temperature within said cabinet, wherein a temperature control device monitors said measured air temperature from said first temperature sensor, determines a temperature difference between said measured air temperature to a preselected air temperature, and controls said air cooling device to reduce said temperature difference.

18. The apparatus of claim 1, wherein said cabinet includes a plurality of pairs of parallel rails, wherein each of said pairs of parallel rails supports at least one food products transfer tray.

19. The apparatus of claim 18, wherein said plurality of pairs of parallel rails are aligned, such that said trays are vertically stacked within said cabinet and wherein said plurality of air inlet ports are aligned in a plurality of rows, each of said rows being substantially parallel to at least one of said pairs of parallel rails.

20. An apparatus for preparing food products using high velocity air flow, comprising a cabinet for holding food products, a blower for supplying an air flow to said cabinet to heat said food products to a preparation temperature and to maintain said food products at a holding temperature, and a first temperature sensor for measuring an air temperature within said cabinet:

wherein said cabinet includes a plurality of air inlet ports through which at least a portion of said air flow enters said cabinet, and a plurality of air outlet ports from which said air flow exits said cabinet; and wherein said air flow is controlled at a rate within a first predetermined range during a preparation period and within a second predetermined range during a holding period;

further comprising a temperature control device, which monitors said measured air temperature from said first temperature sensor, determines a temperature difference between said measured air temperature to a preselected air temperature, and adjusts said air flow rate to reduce said temperature difference.

21. An apparatus for preparing food products using high velocity air flow, comprising a cabinet for holding food products, a variable speed blower for supplying an air flow to said cabinet and a heater for heating said air flow entering said cabinet to heat said food products to a preparation temperature and to maintain said food products at a holding temperature, and an air temperature control device for adjusting a temperature of said air within said cabinet including a first temperature sensor for measuring said air temperature within said cabinet:

wherein said cabinet includes a plurality of air inlet ports through which at least a portion of said air flow enters said cabinet, and a plurality of air outlet ports from which said air flow exits said cabinet, and wherein said air flow is controlled at a rate within a first range of about 1800 to 2000 cubic feet per minute during a preparation period and within a second range of about 810 to about 930 cubic feet per minute during a holding period.

22. The apparatus of claim 21, wherein said preparation temperature is less than about 150° F.

23. The apparatus of claim 21, wherein said preparation temperature is about 140° F. and the preparation period is about 30 minutes and said holding temperature is about 130° F. and the holding period is about 210 minutes.

24. A system for preparing food products using high velocity air flow, comprising at least one moisture retaining storage package for encasing food products, a cabinet for holding said packages of food products, and a blower for supplying an air flow to said cabinet to heat said food products to a preparation temperature and to maintain said food products at a holding temperature:

wherein said cabinet includes a plurality of air inlet ports through which at least a portion of said air flow enters said cabinet and is directed against said packages, and a plurality of air outlet ports from which said air flow exits said cabinet, and wherein said air flow is controlled at a rate within a first predetermined range during a preparation period and within a second predetermined range during a holding period.

25. An apparatus for preparing food products using high velocity air flow, comprising a cabinet for holding food products, a blower for supplying an air flow to said cabinet to heat said food products to a preparation temperature and to maintain said food products at a holding temperature, and a second temperature sensor for measuring a temperature of said food products:

wherein said cabinet includes a plurality of air inlet ports through which at least a portion of said air flow enters said cabinet, and a plurality of air outlet ports from which said air flow exits said cabinet; and wherein said air flow is controlled at a rate within a first predetermined range during a preparation period and within a second predetermined range during a holding period;

further comprising a temperature control device, which monitors said measured temperature of said food products from said second temperature sensor, determines a temperature difference between said measured temperature of said food products to a preselected food products temperature, and adjusts said air flow rate to reduce said temperature difference.

* * * * *